US011894723B2

(12) United States Patent
Yoneda et al.

(10) Patent No.: US 11,894,723 B2
(45) Date of Patent: Feb. 6, 2024

(54) ELECTRIC TOOL

(71) Applicant: Panasonic Intellectual Property Management Co., Ltd., Osaka (JP)

(72) Inventors: Fumiiki Yoneda, Osaka (JP); Kenji Hanamura, Osaka (JP); Masayuki Nakahara, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 174 days.

(21) Appl. No.: 17/604,407

(22) PCT Filed: Jan. 30, 2020

(86) PCT No.: PCT/JP2020/003299
§ 371 (c)(1),
(2) Date: Oct. 16, 2021

(87) PCT Pub. No.: WO2020/217626
PCT Pub. Date: Oct. 29, 2020

(65) Prior Publication Data
US 2022/0216746 A1 Jul. 7, 2022

(30) Foreign Application Priority Data
Apr. 24, 2019 (JP) ................. 2019-083350

(51) Int. Cl.
*B60W 30/04* (2006.01)
*H02K 1/22* (2006.01)
(Continued)

(52) U.S. Cl.
CPC ............. *H02K 1/223* (2013.01); *H02K 7/145* (2013.01); *H02P 21/06* (2013.01)

(58) Field of Classification Search
CPC ........ H02K 1/223; H02K 7/145; H02P 21/06; H02P 21/0089; H02P 25/022;
(Continued)

(56) References Cited

U.S. PATENT DOCUMENTS

2008/0297080 A1  12/2008  Bosch
2011/0057597 A1   3/2011  Bosch et al.
(Continued)

FOREIGN PATENT DOCUMENTS

JP    H10-248105 A    9/1998
JP    2005-168136 A   6/2005
(Continued)

OTHER PUBLICATIONS

International Search Report for corresponding Application No. PCT/JP2020/003299, dated Mar. 10, 2020.
(Continued)

*Primary Examiner* — Cortez M Cook
(74) *Attorney, Agent, or Firm* — Renner, Otto, Boisselle & Sklar, LLP

(57) ABSTRACT

An electric tool includes an AC motor (an electric motor) and a control unit. The AC motor includes a permanent magnet and a coil. The control unit is configured to perform control on operation of the AC motor. The control performed by the control unit includes field weakening control. In the field weakening control, the control unit causes a flux-weakening current to flow through the coil. The flux-weakening current is a current that generates, in the coil, a magnetic flux that weakens a magnetic flux of the permanent magnet.

6 Claims, 4 Drawing Sheets

(51) Int. Cl.
*H02K 7/14* (2006.01)
*H02P 21/06* (2016.01)

(58) Field of Classification Search
CPC ... H02P 29/024; Y02E 60/10; B25B 23/1475; B25F 5/00; B60W 30/04
See application file for complete search history.

(56) References Cited

U.S. PATENT DOCUMENTS

| | | | |
|---|---|---|---|
| 2012/0223663 A1* | 9/2012 | Dietl | H02K 29/06 |
| | | | 318/434 |
| 2014/0210379 A1* | 7/2014 | Kato | H02P 6/153 |
| | | | 318/139 |
| 2014/0210391 A1 | 7/2014 | Bozic et al. | |
| 2021/0276540 A1* | 9/2021 | Dastous | B60W 30/04 |

FOREIGN PATENT DOCUMENTS

| | | |
|---|---|---|
| JP | 2008-502290 A | 1/2008 |
| JP | 2010-537621 A | 12/2010 |
| JP | 2013-074648 A | 4/2013 |
| JP | 2014-144496 A | 8/2014 |
| JP | 6085488 B2 | 2/2017 |

OTHER PUBLICATIONS

Written Opinion for corresponding Application No. PCT/JP2020/003299, dated Mar. 10, 2020.

* cited by examiner

ELECTRIC TOOL

TECHNICAL FIELD

The present disclosure generally relates to electric tools, and more specifically relates to an electric tool including an electric motor.

BACKGROUND ART

An electric tool configured to control the rotation number of an electric motor has been known (e.g., Patent Literature 1). The electric tool described in Patent Literature 1 includes a brushless DC motor (an electric motor), a battery voltage detector, a rotational position detector, and a control unit. The battery voltage detector is configured to detect the voltage of a battery used to drive the brushless DC motor. The rotational position detector is configured to detect the rotational position of the brushless DC motor. The control unit is configured to control a drive output to the brushless DC motor based on a signal from the rotational position detector. The control unit is configured to, when controlling the drive output to the brushless DC motor, control a conduction angle or an advance angle to the brushless DC motor such that the rotation number or the energizing current of the brushless DC motor is a target value corresponding to the battery voltage detected by the battery voltage detector.

CITATION LIST

Patent Literature

Patent Literature 1: JP 2014-144496 A

SUMMARY OF INVENTION

It is an object of the present disclosure to provide an electric tool configured to increase the rotation number of an electric motor.

An electric tool according to one aspect of the present disclosure includes an electric motor and a control unit. The electric motor includes a permanent magnet and a coil. The control unit is configured to perform control on operation of the electric motor. The control performed by the control unit includes field weakening control by which the control unit causes a flux-weakening current to flow through the coil. The flux-weakening current is a current that generates, in the coil, a magnetic flux that weakens a magnetic flux of the permanent magnet.

DESCRIPTION OF EMBODIMENTS

An embodiment of an electric tool 1 will now be described in detail with reference to the accompanying drawings. Note that the embodiment to be described below is only an exemplary one of various embodiments of the present disclosure and should not be construed as limiting. Rather, the exemplary embodiment may be readily modified in various manners depending on a design choice or any other factor without departing from the scope of the present disclosure. Also, FIG. 2 to be referred to in the following description of the embodiment is a schematic representation. That is to say, the ratio of the dimensions (including thicknesses) of respective constituent elements illustrated in FIG. 2 does not always reflect their actual dimensional ratio.

(1) Overview

Figure 1:
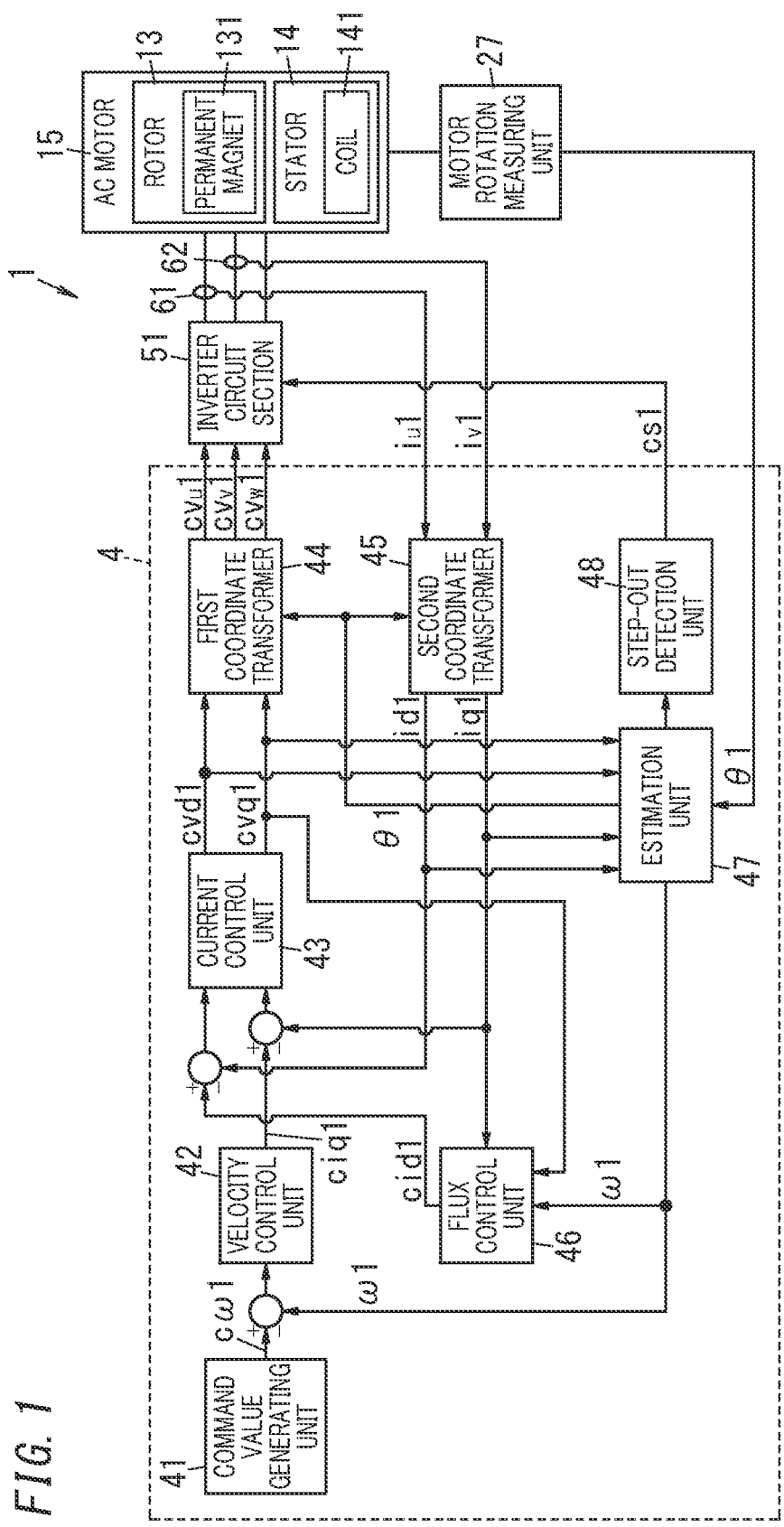
FIG. 1 is a block diagram illustrating an electric tool according to an embodiment.

An electric tool 1 according to an exemplary embodiment may be used as an impact screwdriver, a drill screwdriver, or an impact wrench. The electric tool 1 includes an AC motor 15 (an electric motor) and a control unit 4 as shown in FIG. 1. The AC motor 15 may be a brushless motor, for example. In particular, the AC motor 15 according to this embodiment is a synchronous motor and is more specifically a Permanent Magnet Synchronous Motor (PMSM). The control unit 4 performs control on the operation of the AC motor 15.

The AC motor 15 includes a rotor 13 having a permanent magnet 131 and a stator 14 having a coil 141. The rotor 13 includes an output shaft 16. Electromagnetic interaction between the coil 141 and the permanent magnet 131 rotates the rotor 13 with respect to the stator 14. The control unit 4 performs vector control for controlling a flux-weakening current (d-axis current) supplied to the AC motor 15 and a torque current (q-axis current) supplied to the AC motor 15 independently of each other. The control performed by the control unit 4 includes field weakening control by the vector control. In the field weakening control, the control unit 4 causes the flux-weakening current (d-axis current) to flow through the coil 141 of the AC motor 15. The flux-weakening current generates, in the coil 141, a magnetic flux that weakens the magnetic flux of the permanent magnet 131 (weakening flux). In other words, the flux-weakening current generates, in the coil 141, a magnetic flux, of which the direction is opposite from the direction of the magnetic flux of the permanent magnet 131. This increases the rotation number of the AC motor 15 (the rotation number of the output shaft 16).

The control performed by the control unit 4 further includes regular control. The control unit 4 does not cause the flux-weakening current to flow through the coil 141 in the regular control. That is, a current that flows through the coil 141 in the regular control is only the torque current (q-axis current). When the torque current of the AC motor 15 is relatively large (e.g., the magnitude of the torque current exceeds a predetermined value), the control unit 4 changes its control from the field weakening control to the regular control. Thus, when the AC motor 15 needs a relatively large torque, the regular control provides the relatively large torque.

(2) Electric Tool

Figure 2:
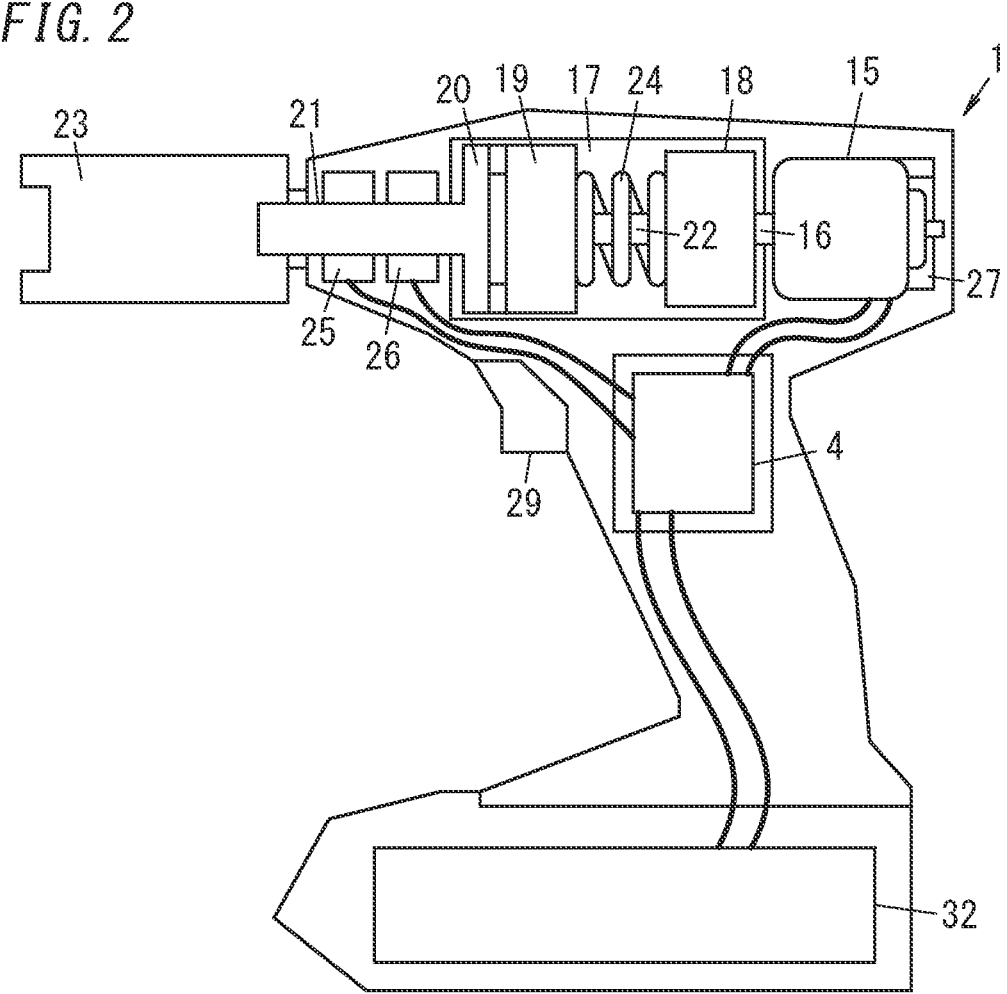
FIG. 2 is a diagram schematically illustrating the electric tool.

The electric tool 1 includes the AC motor 15, a power supply 32, a driving force transmission mechanism 18, an impact mechanism 17, a socket 23, a trigger volume 29, the control unit 4, a torque measuring unit 26, a bit rotation measuring unit 25, and a motor rotation measuring unit 27 as shown in FIG. 2. In addition, the electric tool 1 further includes a tip tool.

The impact mechanism 17 has an output shaft 21. The output shaft 21 is a member to rotate with driving force transmitted from the AC motor 15. The socket 23 is a member, which is fixed to the output shaft 21 and to which the tip tool is attached removably. The electric tool 1 is a tool for driving the tip tool with the driving force supplied from the AC motor 15. The tip tool (hereinafter also referred to as a "bit") may be a screwdriver or a drill, for example. A tip tool is selected from various types of tip tools according to the intended use and attached to the socket 23 to have some type of machining work done. Optionally, the tip tool may be directly attached to the output shaft 21.

The AC motor 15 is a drive source for driving the tip tool. The AC motor 15 includes the output shaft 16 for outputting rotational driving force. The power supply 32 is an AC power supply for supplying a current for driving the AC motor 15. The power supply 32 includes a single or a plurality of secondary batteries. The driving force transmission mechanism 18 regulates the rotational driving force of the AC motor 15 and outputs a desired torque. The driving force transmission mechanism 18 includes a drive shaft 22 as its output member.

The drive shaft 22 of the driving force transmission mechanism 18 is connected to the impact mechanism 17. The impact mechanism 17 transforms the rotational driving force supplied from the AC motor 15 via the driving force transmission mechanism 18 into a pulsed torque, thereby generating impacting force. The impact mechanism 17 includes a hammer 19, an anvil 20, the output shaft 21, and a spring 24. The hammer 19 is attached to the drive shaft 22 of the driving force transmission mechanism 18 via a cam mechanism. The anvil 20 is coupled to the hammer 19 and rotates along with the hammer 19. The spring 24 biases the hammer 19 toward the anvil 20. The anvil 20 is formed integrally with the output shaft 21. Alternatively, the anvil 20 may be formed separately from the output shaft 21 and fixed to the output shaft 21.

Unless a load (torque), of which the magnitude is greater than or equal to a predetermined value, is applied to the output shaft 21, the drive shaft 22 and the hammer 19 which are coupled together via the cam mechanism turn along with each other, and in addition, the hammer 19 and the anvil 20 turn along with each other. Thus, the output shaft 21 formed integrally with the anvil 20 turns accordingly. On the other hand, if a load, of which the magnitude is greater than or equal to the predetermined value, is applied to the output shaft 21, then the hammer 19 moves backward (i.e., moves away from the anvil 20) against the spring 24 while being regulated by the cam mechanism. At a point in time when the hammer 19 is decoupled from the anvil 20, the hammer 19 starts moving forward while turning, thus applying impacting force to the anvil 20 in the rotational direction and thereby turning the output shaft 21.

The trigger volume 29 is an operating member for accepting an operating command for controlling the rotation of the AC motor 15. The ON/OFF states of the AC motor 15 may be switched by pulling the trigger volume 29. In addition, the rotational velocity of the output shaft 21, i.e., the rotational velocity of the AC motor 15, is adjustable by the manipulative variable indicating how deep the trigger volume 29 has been pulled. Specifically, the greater the manipulative variable is, the higher the rotational velocity of the AC motor 15 becomes. The control unit 4 starts or stops turning the AC motor 15 and controls the rotational velocity of the AC motor 15 according to the manipulative variable indicating how deep the trigger volume 29 has been pulled. In this electric tool 1, the tip tool is attached to the socket 23. Controlling the rotational velocity of the AC motor 15 by operating the trigger volume 29 allows the rotational velocity of the tip tool to be controlled.

The electric tool 1 according to this embodiment includes the socket 23, thus making the tip tool replaceable depending on the intended use. However, the tip tool does not have to be replaceable. Alternatively, the electric tool 1 may also be designed to allow the use of only a particular type of tip tool.

The torque measuring unit 26 measures the operating torque of the AC motor 15. The torque measuring unit 26 may be a magnetostriction strain sensor which may detect torsion strain, for example. The magnetostriction strain sensor makes a coil, provided in a non-rotating portion of the AC motor 15, detect a variation in permeability corresponding to the strain caused by the application of a torque to the output shaft 16 of the AC motor 15 and outputs a voltage signal, of which the magnitude is proportional to the magnitude of the strain.

The bit rotation measuring unit 25 measures the rotational angle of the output shaft 21. In this case, the rotational angle of the output shaft 21 is equal to the rotational angle of the tip tool (bit). As the bit rotation measuring unit 25, a photoelectric encoder or a magnetic encoder may be adopted, for example.

The motor rotation measuring unit 27 measures the rotational angle of the AC motor 15. As the motor rotation measuring unit 27, a photoelectric encoder or a magnetic encoder may be adopted, for example.

(3) Control Unit

The control unit 4 includes a computer system including one or more processors and a memory. At least some of the functions of the control unit 4 are performed by making the processor of the computer system execute a program stored in the memory of the computer system. The program may be stored in the memory. The program may also be downloaded via a telecommunications network such as the Internet or distributed after having been stored in a non-transitory storage medium such as a memory card.

The control performed by the control unit 4 includes the field weakening control and the regular control. In the field weakening control, the control unit 4 causes the flux-weakening current to flow from an inverter circuit section 51 through the coil 141 of the AC motor 15. The control unit 4 does not cause the flux-weakening current to flow from the inverter circuit section 51 through the coil 141 in the regular control. When a switching condition described later are satisfied, the control performed by the control unit 4 is the field weakening control. The regular control is control performed such that a command value (target value) cid1 of the flux-weakening current is set to 0 and the flux-weakening current converges toward the command value cid1. The field weakening control is control performed such that the command value cid1 of the flux-weakening current is set to be greater than 0 and the flux-weakening current converges toward the command value cid1. When the command value cid1 of the flux-weakening current is greater than 0, the flux-weakening current flows through the AC motor 15, thereby generating the weakening flux.

As shown in FIG. 1, the control unit 4 includes a command value generating unit 41, a velocity control unit 42, a current control unit 43, a first coordinate transformer 44, a second coordinate transformer 45, a flux control unit 46, an estimation unit 47, and a step-out detection unit 48. In addition, the electric tool 1 further includes the inverter circuit section 51 and a plurality of (e.g., two in the example illustrated in FIG. 1) current sensors 61 and 62. The control unit 4 is used along with the inverter circuit section 51 and performs feedback control to control the operation of the AC motor 15.

Each of the plurality of current sensors 61 and 62 includes, for example, a Hall element current sensor or a shunt resistor element. The plurality of current sensors 61 and 62 measure an electric current supplied from the power supply 32 to the AC motor 15 via the inverter circuit section 51. In this embodiment, three-phase currents (namely, a U-phase current, a V-phase current, and a W-phase current) are supplied to the AC motor 15. The plurality of current sensors 61 and 62 measure currents in at least two phases. In FIG. 1, the current sensor 61 measures the U-phase current and outputs a current measured value $i_u1$, and the current sensor 62 measures the V-phase current and outputs a current measured value $i_v1$.

The estimation unit 47 performs time differentiation on the rotational angle θ1, measured by the motor rotation measuring unit 27, of the AC motor 15 to calculate an angular velocity ω1 of the AC motor 15 (i.e., the angular velocity of the output shaft 16).

The second coordinate transformer 45 performs, based on the rotational angle θ1, measured by the motor rotation measuring unit 27, of the AC motor 15, coordinate transformation on the current measured values $i_u1$ and $i_v1$ measured by the plurality of current sensors 61 and 62, thereby calculating current measured values id1 and iq1. That is to say, the second coordinate transformer 45 transforms the current measured values $i_u1$ and $i_v1$, corresponding to currents in two phases out of the currents in three phases, into a current measured value id1 corresponding to a magnetic field component (d-axis current) and a current measured value iq1 corresponding to a torque component (q-axis current).

The command value generating unit 41 generates a command value cω1 of the angular velocity of the AC motor 15. The command value generating unit 41 generates the command value cω1 according to, for example, a magnitude corresponding to the manipulative variable indicating how deep the trigger volume 29 (see FIG. 2) has been pulled. That is to say, as the manipulative variable increases, the command value generating unit 41 increases the command value cω1 of the angular velocity accordingly.

The velocity control unit 42 generates a command value ciq1 based on the difference between the command value cω1 generated by the command value generating unit 41 and the angular velocity col calculated by the estimation unit 47. The command value ciq1 is a command value specifying the magnitude of the torque current (q-axis current) of the AC motor 15. The velocity control unit 42 determines the command value ciq1 to reduce the difference between the command value cω1 and the angular velocity col.

The flux control unit 46 generates a command value cid1 based on the angular velocity col calculated by the estimation unit 47, a command value cvq1 (which will be described later) generated by the current control unit 43, and the current measured value iq1 (q-axis current). The command value cid1 is a command value that specifies the magnitude of the flux-weakening current (a current component that generates a magnetic flux in a d-axis direction) of the AC motor 15. When the control performed by the control unit 4 is the regular control, the command value cid1 generated by the flux control unit 46 is a command value for adjusting the flux-weakening current to 0. When the control performed by the control unit 4 is the field weakening control, the flux control unit 46 determines the command value cid1 by a determination process which will be described later.

The current control unit 43 generates a command value cvd1 based on the difference between the command value cid1 generated by the flux control unit 46 and the current measured value id1 calculated by the second coordinate transformer 45. The command value cvd1 is a command value that specifies the magnitude of a d-axis voltage of the AC motor 15. The current control unit 43 determines the command value cvd1 to reduce the difference between the command value cid1 and the current measured value id1.

In addition, the current control unit 43 also generates the command value cvq1 based on the difference between the command value ciq1 generated by the velocity control unit 42 and the current measured value iq1 calculated by the second coordinate transformer 45. The command value cvq1 is a command value that specifies the magnitude of a q-axis voltage of the AC motor 15. The current control unit 43 generates the command value cvq1 to reduce the difference between the command value ciq1 and the current measured value iq1.

The first coordinate transformer 44 performs coordinate transformation on the command values cvd1 and cvq1 based on the rotational angle θ1, measured by the motor rotation measuring unit 27, of the AC motor 15 to calculate command values $cv_u1$, $cv_v1$, and $cv_w1$. Specifically, the first coordinate transformer 44 transforms the command value cvd1 for a magnetic field component (d-axis voltage) and the command value cvq1 for a torque component (q-axis voltage) into command values $cv_u1$, $cv_v1$, and $cv_w1$ corresponding voltages in three phases. Specifically, the command value $cv_u1$ corresponds to a U-phase voltage, the command value $cv_v1$ corresponds to a V-phase voltage, and the command value $cv_w1$ corresponds to a W-phase voltage.

The inverter circuit section 51 supplies voltages in three phases, corresponding to the command values $cv_u1$, $cv_v1$, and $cv_w1$, respectively, to the AC motor 15. The control unit 4 controls the power to be supplied to the AC motor 15 by performing Pulse Width Modulation (PWM) control on the inverter circuit section 51.

The AC motor 15 is driven with the power (voltages in three phases) supplied from the inverter circuit section 51, thus generating rotational driving force.

As a result, the control unit 4 controls the flux-weakening current such that the flux-weakening current flowing through the coil 141 of the AC motor 15 has a magnitude corresponding to the command value cid1 generated by the flux control unit 46. Moreover, the control unit 4 controls the angular velocity of the AC motor 15 such that the angular velocity of the AC motor 15 is an angular velocity corresponding to the command value cω1 generated by the command value generating unit 41.

The step-out detection unit 48 detects a step-out (loss of synchronism) of the AC motor 15 based on the current measured values id1 and iq1 acquired from the second coordinate transformer 45 and the command values cvd1 and cvq1 acquired from the current control unit 43. On detecting the step-out, the step-out detection unit 48 transmits a stop signal cs1 to the inverter circuit section 51, thus stopping the supply of power from the inverter circuit section 51 to the AC motor 15.

(4) Details of Field Weakening Control

Next, the determination process of the command value cid1 by the flux control unit 46 will be described. In this embodiment, the d-axis current when the weakening flux is generated is referred to as a negative current.

As the command value cid1 increases, the d-axis current adjusted in accordance with the command value cid1 increases. The d-axis current transitions basically at 0 amperes or less (see FIG. 4) except for the start of the electric tool 1, and when the d-axis current has a negative value, the weakening flux is generated. When the d-axis current is a negative value, and as the absolute value of the d-axis current increases, the weakening flux increases. The flux control unit 46 determines the command value cid1 of the d-axis current at predetermined time intervals (e.g., every several tens of microseconds) by the determination process shown in FIG. 3.

When the switching condition, which is predetermined, is satisfied, the control unit 4 causes the flux-weakening current to flow through the coil 141 of the AC motor 15. That is, when the switching condition is satisfied, the control performed by the control unit 4 is the field weakening control. The switching condition includes a condition that the AC motor 15 is operating within a high-velocity range. While the AC motor 15 is operating within the high-velocity range, schematically, the rotation number of the AC motor 15 is relatively high. In the present embodiment, "while the AC motor 15 is operating within the high-velocity range" is defined by that the rotation number of the AC motor 15 is greater than or equal to a predetermined rotation number R1 (see FIG. 4) and the duty of the PWM control performed by the control unit 4 with respect to the inverter circuit section 51 is greater than or equal to a predetermined value. That is, the high-velocity range is an operation range within which the rotation number of the AC motor 15 is greater than or equal to the predetermined rotation number R1. Moreover, the high-velocity range is an operation range within which the duty (the degree of modulation) of the PWM control is greater than or equal to the predetermined value (hereinafter referred to as a "duty threshold"). The duty of the PWM control is a value obtained by dividing an ON time period in one period of the PWM signal by the length of the one period. The rotation number of the AC motor 15 is substantially proportional to the duty. The duty threshold is, for example, about 0.9 or 0.95.

Figure 4:
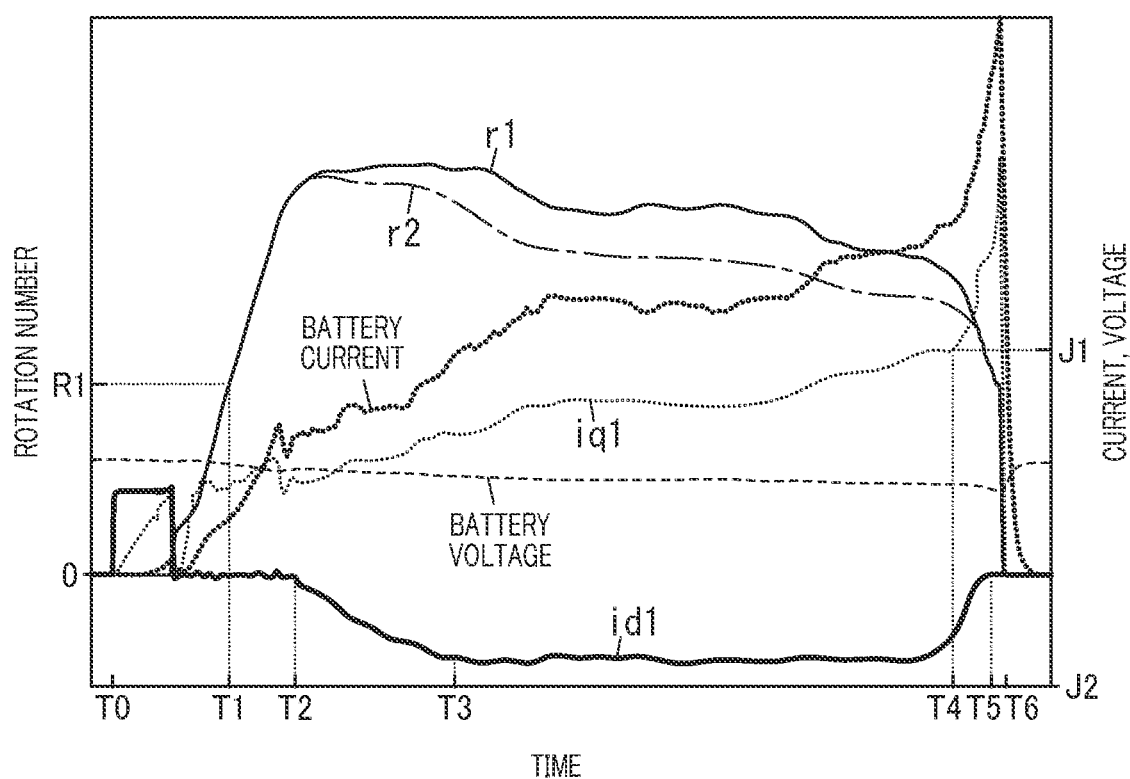
FIG. 4 is a graph illustrating the operation example of the electric tool.

Moreover, the switching condition includes the condition that the value of the torque current (the value of the q-axis current) flowing through the coil 141 of the AC motor 15 is less than or equal to a predetermined current value J1 (see FIG. 4). In the present embodiment, the control unit 4 uses the current measured value iq1 as the value of the torque current to determine whether or not the switching condition is satisfied. Note that the control unit 4 may use, as the value of the torque current, the command value ciq1 of the value of the torque current.

As described below, the switching condition is, as it turns out, the condition that the angular velocity ωl is greater than or equal to a reference value, the current measured value iq1 is less than or equal to the predetermined current value J1, and the command value cvq1 is greater than or equal to a reference voltage. In this case, the reference voltage corresponds to a value obtained by converting the duty threshold into a voltage.

Figure 3:
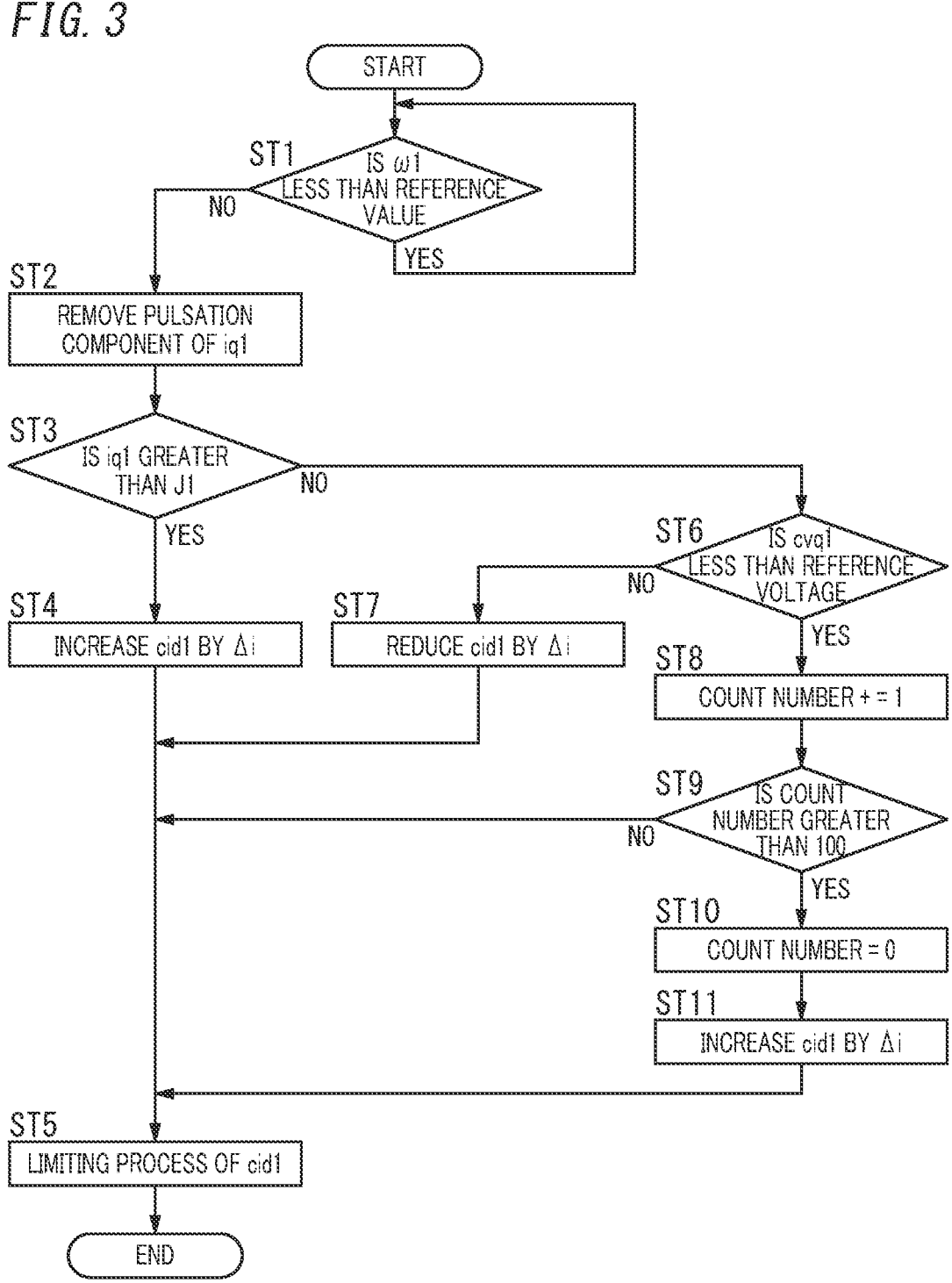
FIG. 3 is a flowchart illustrating an operation example of the electric tool.

The control unit 4 uses, as a value corresponding to the rotation number of the AC motor 15, the angular velocity ωl calculated by the estimation unit 47. That is, as illustrated in FIG. 3, the control unit 4 compares the angular velocity ωl with the reference value (step ST1) to determine whether or not the rotation number of the AC motor 15 is greater than or equal to the predetermined rotation number R1. The reference value is a value obtained by converting the predetermined rotation number R1 into an angular velocity. The reference value is stored in advance in, for example, memory of a microcontroller included in the control unit 4. If the angular velocity ωl is less than the reference value (step ST1: YES), the control unit 4 continues comparing the angular velocity ωl with the reference value. In contrast, if the angular velocity ωl is greater than or equal to the reference value (step ST1: NO), the control unit 4 removes a pulsation component of the current measured value iq1 of the q-axis current (step ST2). Specifically, the control unit 4 removes the pulsation component of the current measured value iq1 by a low pass filter having a cutoff frequency of several tens of hertz (e.g., 20 Hz).

The control unit 4 then compares the current measured value iq1 with the predetermined current value J1 (see FIG. 4) (step ST3). If the current measured value iq1 is greater than the predetermined current value J1 (step ST3: YES), the flux control unit 46 increases the command value cid1 specifying the d-axis current by a predetermined amount Δi (step ST4). That is, the flux control unit 46 generates the command value cid1 which specifies a d-axis current greater than the command value cid1 at a time point before the current measured value iq1 is compared with the predetermined current value J1. The predetermined amount Δi is a predetermined fixed value and is stored in advance in, for example, the memory of the microcontroller included in the control unit 4.

The flux control unit 46 thereafter performs a limiting process of the command value cid1 (step ST5). The limiting process in this case is specifically a process in which if the command value cid1 is less than a predetermined lower limit value J2 (see FIG. 4), the command value cid1 is changed to the predetermined lower limit value J2, and if the command value cid1 is greater than the predetermined upper limit value, the command value cid1 is changed to the predetermined upper limit value. The predetermined upper limit value is 0 amperes here. The flux control unit 46 outputs the command value cid1 after subjected to the limiting process.

Moreover, if the current measured value iq1 is less than or equal to the predetermined current value J1 (step ST3: NO), the flux control unit 46 compares the command value cvq1 specifying the q-axis voltage with the reference voltage (step ST6). The reference voltage is stored in advance in, for example, the memory of the microcontroller included in the control unit 4. If the command value cvq1 is greater than or equal to the reference voltage (step ST6: NO), the flux control unit 46 decreases the command value cid1 specifying the d-axis current by the predetermined amount Δi (step ST7) and performs the limiting process (step ST5) to output the command value cid1. When no flux-weakening current flows through the coil 141 of the AC motor 15, decreasing the command value cid1 in step ST7 causes a flux-weakening current to be started to flow though the coil 141. That is, the control performed by the control unit 4 is switched from the regular control to the field weakening control. After all, the switching condition for starting the field weakening control is the condition that the angular velocity ωl is greater than or equal to the reference value (step ST1: NO), the current measured value iq1 is less than or equal to the predetermined current value J1 (step ST3: NO), and the command value cvq1 is greater than or equal to the reference voltage (step ST6: NO).

As already described, the reference voltage corresponds to a value obtained by converting the duty threshold of the duty of the PWM control into a voltage. That is, the flux control unit 46 determines whether or not the duty of the PWM control is greater than or equal to the duty threshold by comparing the command value cvq1 with the reference voltage. If the command value cvq1 is greater than or equal to the reference voltage, the duty of the PWM control may be regarded to be greater than or equal to the duty threshold.

In step ST6, if the command value cvq1 is less than the reference voltage (step ST6: YES), the flux control unit 46 increases the count number by one (step ST8) and compares the count number with the predetermined value (here, 100) (step ST9). The count number as used herein is a count number of the number times of the determination result that the command value cvq1 is less than the reference voltage is obtained. If the count number is less than or equal to 100 (step ST9: NO), the flux control unit 46 neither increases nor decreases the command value cid1, but the flux control unit 46 performs the limiting process (step ST5), thereby outputting the command value cid1. In contrast, if the count number is greater than the 100 (step ST9: YES), the count number is initialized to 0 (step ST10), and the flux control unit 46 increases the command value cid1 by the predetermined amount Δi (step ST11). Thereafter, the limiting process is performed (step ST5), and the command value cid1 is output.

In the following description, contents in steps ST3 to ST11 are summarized. If the first condition that the current measured value iq1 of the q-axis current is greater than the predetermined current value J1 is satisfied, the command value cid1 of the d-axis current is increased from a negative value toward 0 (step ST4). This decreases the weakening flux. In contrast, if the second condition that the current measured value iq1 of the q-axis current is less than or equal to the predetermined current value J1 and the command value cvq1 of the q-axis voltage is greater than or equal to the reference voltage is satisfied, the command value cid1 of the d-axis current is decreased from 0 or a negative value (step ST7). This increases the weakening flux. Meanwhile, if the third condition that the current measured value iq1 of the q-axis current is less than or equal to the predetermined current value J1 and the command value cvq1 of the q-axis voltage is less than the reference voltage is satisfied, the command value cid1 of the d-axis current is increased from a negative value toward 0 each time the third condition is satisfied 100 times (step ST11). This decreases the weakening flux. If the count number of times that the third condition is satisfied is less than or equal to 100, the command value cid1 of the d-axis current is maintained.

Thus, the control unit 4 has a function of changing the magnitude of the flux-weakening current in the field weakening control. If the second condition (a predetermined increase condition) is satisfied in the field weakening control, the control unit 4 performs gradual-increase control of increasing the absolute value of the flux-weakening current over time in step ST7. In contrast, If the third condition (a predetermined decrease condition) is satisfied in the field weakening control, the control unit 4 performs gradual-decrease control of decreasing the absolute value of the flux-weakening current over time in steps ST8 to ST11. As used herein, "over time" includes an aspect which is not that the flux-weakening current, which is a control object, is changed in one step, and the flux-weakening current stabilizes at a current value after the change but that the flux-weakening current is changed in a plurality of steps, and the value of the flux-weakening current then stabilizes. In the present embodiment, in step ST4, ST7, or ST11, the command value cid1 of the d-axis current changes by the predetermined amount Δi, and the step ST4, ST7, or ST11 is repeated a plurality of number of times, thereby eventually stabilizing the flux-weakening current. The absolute value of the flux-weakening current gradually changes over time, thereby gradually changing the rotation number of the AC motor 15. This lessens the possibility that a worker using the electric tool 1 feels strangeness even when the rotation number is automatically changed by the control performed by the control unit 4.

Here, if the command value cvq1 is less than the reference voltage (if the second condition is satisfied) in step ST6, the control unit 4 performs control of increasing (gradual-increase control of) the absolute value of the flux-weakening current (d-axis current) over time in step ST7. In contrast, if the command value cvq1 is greater than or equal to the reference voltage (the second condition is no longer satisfied and the third condition is satisfied) in step ST6, the control unit 4 performs control of decreasing (gradual-decrease control of) the absolute value of the flux-weakening current over time in steps ST8 to ST11. As described above, if the count number of times that the third condition is satisfied is less than or equal to 100, the command value cid1 of the d-axis current is maintained. Thus, the rate of change of the command value cid1 in steps ST8 to ST11 is less than the rate of change of the command value cid1 in steps ST4 and ST7. That is, the increase rate of the command value cid1 by the gradual-decrease control in the case of the third condition being continuously satisfied is less than the increase rate of the command value cid1 in the case of the first condition being continuously satisfied and than the decrease rate of the command value cid1 by the gradual-increase control in the case of the second condition being continuously satisfied. In sum, the rate of change of the flux-weakening current in the case of the gradual-decrease control is less than the rate of change of the flux-weakening current in the case of the gradual-increase control. Thus, for example, when the length of a time period during which the command value cvq1 of the q-axis voltage is less than the reference voltage is substantially equal to the length of a time period during which the command value cvq1 of the q-axis voltage is greater than or equal to the reference voltage, the flux-weakening current decreases as viewed in a time scale greater than or equal to a certain time scale. Thus, pulsation (hunting) of the flux-weakening current can be suppressed.

FIG. 4 shows an example of the transitions of respective parameters of the electric tool 1 over time when the AC motor 15 is controlled based on the process shown in FIG. 3. In FIG. 4, "battery current" refers to an output current of the power supply 32 of the embodiment, "battery voltage" refers to an output voltage of the power supply 32 of the embodiment, and "iq1" refers to the current measured value iq1 in the electric tool 1 of the embodiment. Moreover, in FIG. 4, "id1" refers to the current measured value id1 in the electric tool 1 of the embodiment, and "r1" refers to the rotation number of the AC motor 15 of the electric tool 1 of the embodiment. Moreover, in FIG. 4, "r2" refers to the rotation number of an AC motor of an electric tool according to a comparative example of the electric tool 1 of the embodiment. The electric tool according to the comparative example always maintains a state where no weakening flux flows through the AC motor. That is, in the electric tool according to the comparative example, the control performed by the control unit is always the regular control.

In this case, the electric tool 1 is assumed to be used as an impact screwdriver or a drill screwdriver for tightening a screw. That is, to the socket 23 (see FIG. 2) of the electric tool 1, a screwdriver is attached. A worker inserts the screwdriver into a screw at a time point before a time point T0. At the time point T0, a worker gives an operation of pulling the trigger volume 29 of the electric tool 1, and thereby, the q-axis current (torque current) starts flowing through the AC motor 15, so that the AC motor 15 starts rotating. Thereafter, the rotation number r1 gradually increases in accordance with the manipulative variable indicating how deep the trigger volume 29 has been pulled. Here, the manipulative variable indicating how deep the trigger volume 29 has been pulled is maximum. Thus, the rotation number r1 increases to an upper limit within an adjustable range. The electric tool of the comparative example is also assumed to be used as an impact screwdriver or a drill screwdriver in a similar manner to the electric tool 1 of the embodiment. Also in the electric tool of the comparative example, the rotation number r2 gradually increases in accordance with the manipulative variable indicating ow deep the trigger volume has been pulled and increases to an upper limit within an adjustable range.

At a time point T1, the rotation number r1 reaches the predetermined rotation number R1. Thereafter, at a time point T2, the switching condition described above is satisfied. Thus, in the electric tool 1 of the embodiment, the control performed by the control unit 4 is switched from the regular control to the field weakening control, so that the d-axis current (flux-weakening current) starts flowing. That is, at and after the time point T2, the current measured value id1 of the d-axis current gradually decreases from 0.

As the screw is screwed into a member, the q-axis current (torque current) required to further tighten the screw may increase. As the q-axis current increases, loss in the interior resistance of the power supply 32 (battery) increases, and therefore, the battery voltage decreases. Thus, a reduction in the rotation number r1 due to the decrease in the battery voltage can be compensated by causing the d-axis current (flux-weakening current) to flow. That is, as compared to the case where the d-axis current is not caused to flow, the reduction in the rotation number r1 can be suppressed. In other words, the rotation number r1 of the AC motor 15 according to the embodiment is, while the d-axis current flows, higher than the rotation number r2 according to the comparative example.

In the electric tool 1 of the embodiment, at a time point T3, the magnitude of the current measured value id1 of the d-axis current is a value close to the predetermined lower limit value J2. By the limiting process (see step ST5), the current measured value id1 of the d-axis current transitions within a range not less than the predetermined lower limit value J2.

At and after a time point T4, the current measured value iq1 of the q-axis current is greater than the predetermined current value J1 (step ST3: YES). Thus, the current measured value id1 of the d-axis current increases from a negative value toward 0. Moreover, around the time point T4, the screw is seated on the member. The predetermined current value J1 is set to a value less than the current measured value iq1 of the q-axis current (torque current) when the screw is seated on the member. That is, when the screw is seated on the member and the torque is relatively large, the current measured value iq1 of the q-axis current exceeds the predetermined current value J1, and in response to this, the control unit 4 thus decreases the absolute value of the d-axis current. In other words, the control unit 4 decreases the flux-weakening current. As a result, the weakening flux decreases. The decrease of the weakening flux enables the AC motor 15 to be driven by increased torque.

Around a time point T5, the magnitude of the flux-weakening current is 0. Moreover, at a time point T6, a worker sets the manipulative variable, indicating how deep the trigger volume 29 has been pulled, to 0, so that the AC motor 15 stops.

According to the embodiment described above, causing the flux-weakening current to flow through the coil 141 of the AC motor 15 can increase the rotation number of the AC motor 15 as compared to the case where the flux-weakening current is not caused to flow. This can shorten a time required for work such as tightening a screw by the electric tool 1. In addition, the possibility that an increased rotation number may distort the shape of a hole formed in a member as a target of boring by the electric tool 1 used as a drill can be lessened.

Moreover, the performance characteristic of the electric tool 1 may vary due to variations of an induced electromotive voltage resulting from a production error of the AC motor 15 or variations of the voltage (the battery voltage) of the power supply 32. Adjusting the magnitude of the flux-weakening current can correct the variations of the performance characteristics of the electric tool 1.

Moreover, in the electric tool 1 of the embodiment, the weakening flux decreases when the current measured value iq1 of the q-axis (torque component) is greater than the predetermined current value J1, and the weakening flux eventually reaches 0. Thus, when the torque of the AC motor 15 is relatively large, larger torque can be output.

That is, in a low-velocity range within which the torque of the AC motor 15 is relatively large and the rotation number of the AC motor 15 is relatively small, decreasing the weakening flux to 0 or to a relatively small value, the magnitude of the torque can be secured. In contrast, within a high-velocity range within which the rotation number of the AC motor 15 is relatively large (larger than at least the predetermined rotation number R1 (see FIG. 4)), causing the flux-weakening current to flow can further increase the rotation number. That is, causing the flux-weakening current to flow enables the AC motor 15 to rotate at a further higher rotation number than the upper limit of the rotation number in the case of no flux-weakening current being caused to flow.

(5) Variations of Embodiment

Variations of the embodiment will be enumerated below. The variations described below may be accordingly combined with each other.

The electric tool 1 may include an operating member configured to receive, for example, an operation of setting parameters relating to operation of the electric tool 1. The operating member may include, for example, a touch panel display configured to receive an operation input and to display information relating to the operation.

The field weakening control and the regular control performed by the control unit 4 may be manually changeable by an operation given to an operating member different from the trigger volume 29. For example, the control performed by the control unit 4 may be changeable by an operation given to the touch panel display.

In the AC motor 15, the rotor 13 may include the coil 141, and the permanent magnet 131 may include the stator 14.

The electric tool 1 is not limited to the impact screwdriver, the drill screwdriver, or the impact wrench. Alternatively, the electric tool 1 may be a screwdriver or a wrench having no impact mechanism 17. Alternatively, the electric tool 1 may be a fraise, a grinder, a cleaner, or an electric tool of a kind other than these tools.

Here, "the AC motor 15 operates within the high-velocity range" may be defined by that the rotation number of the AC motor 15 is greater than or equal to the predetermined rotation number R1 or by that the duty of the PWM control is greater than or equal to the duty threshold.

The flux control unit 46 may control such that the increase rate of the command value cid1 of the d-axis current when the first condition is satisfied is greater than the decrease rate of the command value cid1 of the d-axis current when the second condition is satisfied. This lessens the possibility that the d-axis current pulsates. Such a configuration can be embodied by, for example, increasing the command value cid1 of the d-axis current each time the first condition is satisfied one time and decreasing the command value cid1 of the d-axis current each time the second condition is satisfied a plurality of times.

The condition for switching the control performed by the control unit 4 to the field weakening control may be one of the following plurality of conditions or a condition obtained by accordingly combining two or more of the following plurality of conditions with each other. The plurality of conditions are, for example, a condition relating to the rotation number of the AC motor 15, a condition relating to the duty of the PWM control, a condition relating to the q-axis current of the AC motor 15, and a condition relating to the q-axis voltage of the AC motor 15.

(6) Summary

The embodiment and the like described above discloses the following aspects.

An electric tool 1 according to a first aspect includes an AC motor 15 (an electric motor) and a control unit 4. The AC motor 15 includes a permanent magnet 131 and a coil 141. The control unit 4 is configured to perform control on the operation of the AC motor 15. The control performed by the control unit 4 includes field weakening control by which the control unit 4 causes a flux-weakening current to flow through the coil 141. The flux-weakening current is a current that generates, in the coil 141, a magnetic flux that weakens a magnetic flux of the permanent magnet 131.

With this configuration, the control unit 4 performs the field weakening control of the AC motor 15 (electric motor), thereby increasing the rotation number of the AC motor 15 as compared to the case where the field weakening control is not performed.

In an electric tool 1 of a second aspect referring to the first aspect, the control performed by the control unit 4 includes the field weakening control and the regular control. The control unit 4 is configured not to cause the flux-weakening current to flow through the coil 141 in the regular control. The control performed by the control unit 4 is the field weakening control when a switching condition which is predetermined is satisfied.

With this configuration, in the regular control, no flux-weakening current flows through the coil 141, and therefore, the torque of the AC motor 15 (electric motor) is greater than in the case of the control performed by the control unit 4 being the field weakening control.

In an electric tool 1 of a third aspect referring to the second aspect, the switching condition includes a condition that the AC motor 15 (electric motor) is operating within a high-velocity range.

With this configuration, the control performed by the control unit 4 is automatically switched in accordance with the rotation number of the AC motor 15 (electric motor).

In an electric tool 1 of a fourth aspect referring to the third aspect, the high-velocity range is an operation range within which a rotation number of the AC motor 15 (electric motor) is greater than or equal to a predetermined rotation number.

With this configuration, the rotation number of the AC motor 15 is further increased when the rotation number of the AC motor 15 (electric motor) is relatively high.

In an electric tool 1 of a fifth aspect referring to the third or fourth aspect, the control unit 4 is configured to control electric power to be supplied to the AC motor 15 (electric motor) by PWM control. The high-velocity range is an operation range within which a duty of the PWM control is greater than or equal to a predetermined value.

With this configuration, when the duty of the PWM control is relatively large, and thus, the rotation number of the AC motor 15 (electric motor) is relatively high, the rotation number of the AC motor 15 is further increased.

In an electric tool 1 of a sixth aspect referring to any one of the second to fifth aspects, the switching condition includes a condition that a value of a torque current flowing through the coil 141 is less than or equal to a predetermined current value J1.

With this configuration, when the value of the torque current is relatively small, and thus, the rotation number of the AC motor 15 is relatively high, the rotation number of the AC motor 15 (electric motor) is further increased.

In an electric tool 1 of a seventh aspect referring to any one of the first to sixth aspects, the control unit 4 has a function of changing a magnitude of the flux-weakening current in the field weakening control. More specifically, the control unit 4 is configured to, in the field weakening control, change a magnitude of the flux-weakening current when the condition (the increase condition or the decrease condition) is satisfied.

This configuration enables the rotation number of the AC motor 15 (electric motor) to be more finely controlled as compared to the case where the magnitude of the flux-weakening current is constant.

In an electric tool 1 of an eighth aspect referring to the seventh aspect, the control unit 4 is configured to, when a predetermined increase condition is satisfied, perform gradual-increase control of increasing an absolute value of the flux-weakening current over time in the field weakening control.

With this configuration, the change in the rotation number of the AC motor 15 (electric motor) is moderate as compared to the case where the flux-weakening current is changed in, for example, a binary manner, and therefore, a worker easily works by using the electric tool 1.

In an electric tool 1 of a ninth aspect referring to the seventh or eighth aspect, the control unit 4 is configured to, when a predetermined decrease condition is satisfied, perform gradual-decrease control of decreasing an absolute value of the flux-weakening current over time in the field weakening control.

With this configuration, the change in the rotation number of the AC motor 15 (electric motor) is moderate as compared to the case where the flux-weakening current is changed in, for example, a binary manner, and therefore, a worker easily works by using the electric tool 1.

In an electric tool 1 of a tenth aspect referring to the eighth aspect, the control unit 4 is configured to, when a predetermined decrease condition is satisfied, perform gradual-decrease control of decreasing the absolute value of the flux-weakening current over time in the field weakening control. The predetermined decrease condition is different from the predetermined increase condition. A rate of change of the flux-weakening current in the gradual-decrease control is less than a rate of change of the flux-weakening current in the gradual-increase control.

This configuration lessens the possibility that the flux-weakening current pulsates along with the pulsation of parameters relating to the predetermined increase condition and the predetermined decrease condition.

The configurations other than the configuration of the first aspect are not essential configurations of the electric tool 1 and may accordingly be omitted.

REFERENCE SIGNS LIST

1 Electric Tool
4 Control Unit

15 AC Motor (Electric Motor)
131 Permanent Magnet
141 Coil
J1 Predetermined Current Value

The invention claimed is:

1. An electric tool, comprising:
   an electric motor including a permanent magnet and a coil; and
   a control unit configured to perform control on operation of the electric motor,
   the control performed by the control unit including field weakening control by which the control unit causes a flux-weakening current to flow through the coil, the flux-weakening current being a current that generates, in the coil, a magnetic flux that weakens a magnetic flux of the permanent magnet
   the control unit having a function of changing a magnitude of the flux-weakening current in the field weakening control,
   the control unit being configured to, when a predetermined increase condition is satisfied, perform gradual-increase control of increasing an absolute value of the flux-weakening current over time in the field weakening control,
   the control unit being configured to, when a predetermined decrease condition is satisfied, perform gradual-decrease control of decreasing the absolute value of the flux-weakening current over time in the field weakening control, the predetermined decrease condition being different from the predetermined increase condition, a rate of change of the flux-weakening current in the gradual-decrease control being less than a rate of change of the flux-weakening current in the gradual-increase control.

2. The electric tool of claim 1, wherein
   the control performed by the control unit includes
      the field weakening control and
      regular control in which the flux-weakening current is not caused to flow through the coil, and
   the control performed by the control unit is the field weakening control when a switching condition which is predetermined is satisfied.

3. The electric tool of claim 2, wherein
   the switching condition includes a condition that the electric motor is operating within a high-velocity range.

4. The electric tool of claim 3, wherein
   the high-velocity range is an operation range within which a rotation number of the electric motor is greater than or equal to a predetermined rotation number.

5. The electric tool of claim 3, wherein
   the control unit is configured to control electric power to be supplied to the electric motor by PWM control, and
   the high-velocity range is an operation range within which a duty of the PWM control is greater than or equal to a predetermined value.

6. The electric tool of claim 2, wherein
   the switching condition includes a condition that a value of a torque current flowing through the coil is less than or equal to a predetermined current value.

* * * * *